May 16, 1967  G. BIXBY, JR., ETAL  3,320,073
MEANS FOR BREWING COFFEE
Filed Oct. 16, 1964  3 Sheets-Sheet 1
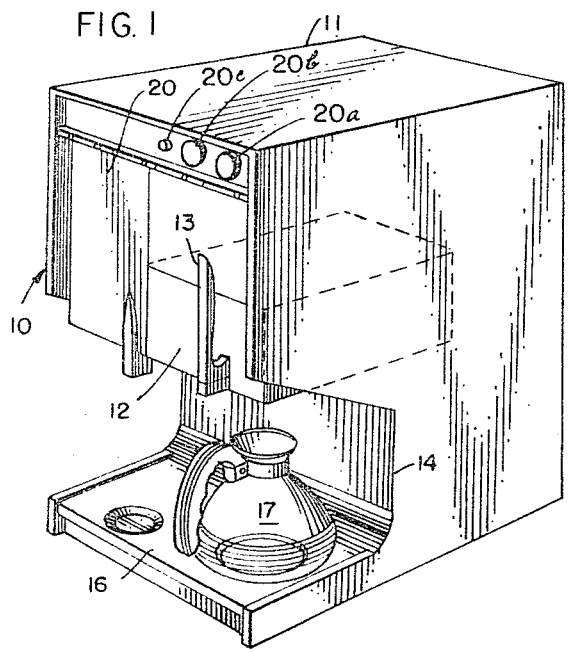
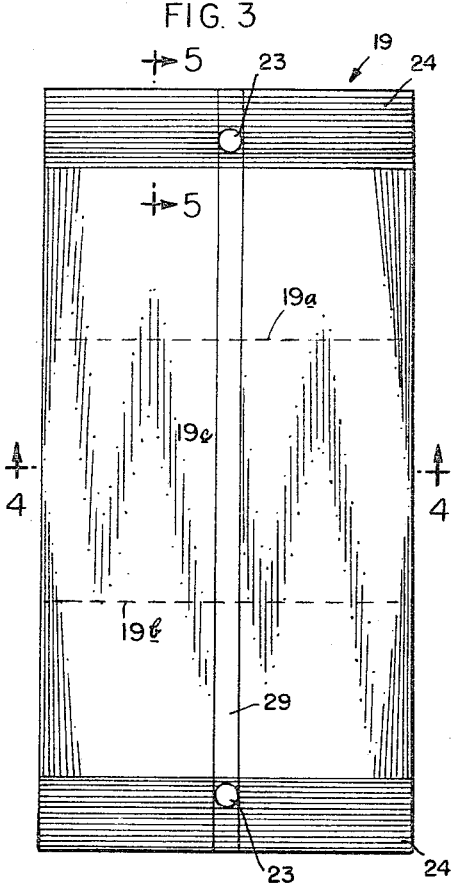
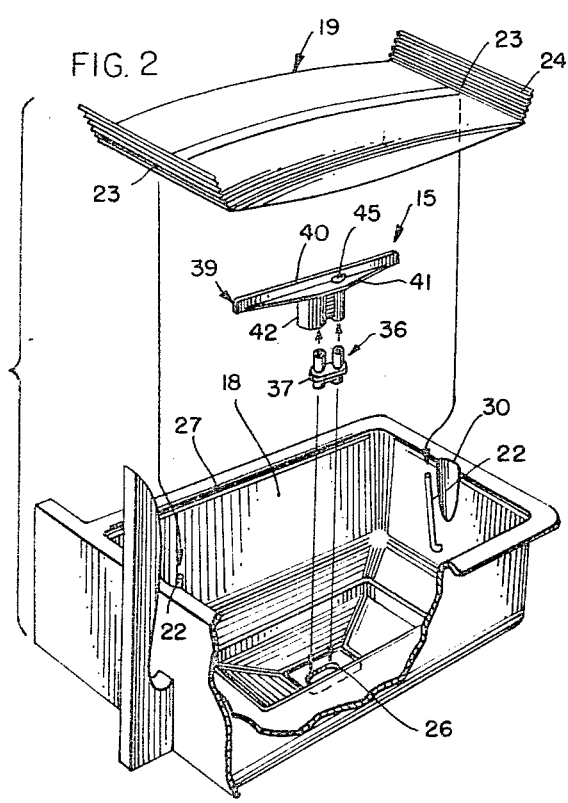
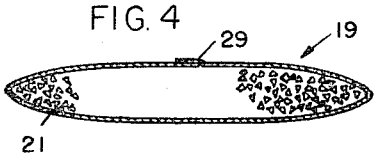
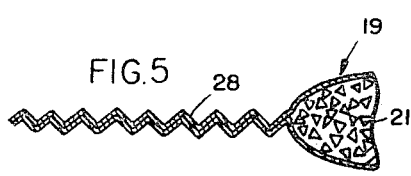
INVENTOR.
GEORGE BIXBY, JR.
JERRY DEVARIS
BY: Dawson, Tilton, Fallon, Lungmus & Alexander
ATT'YS

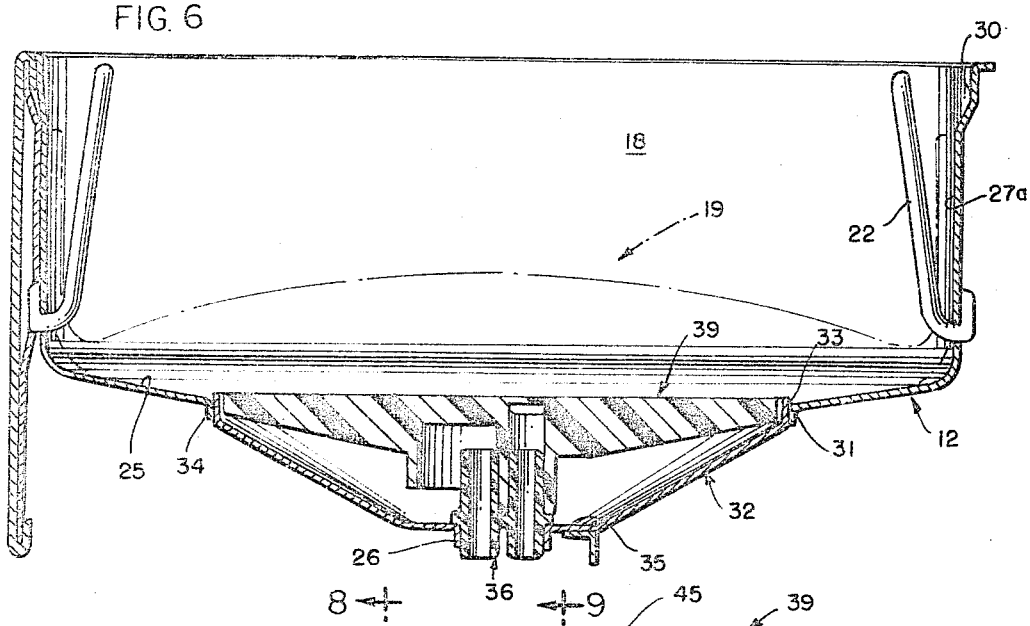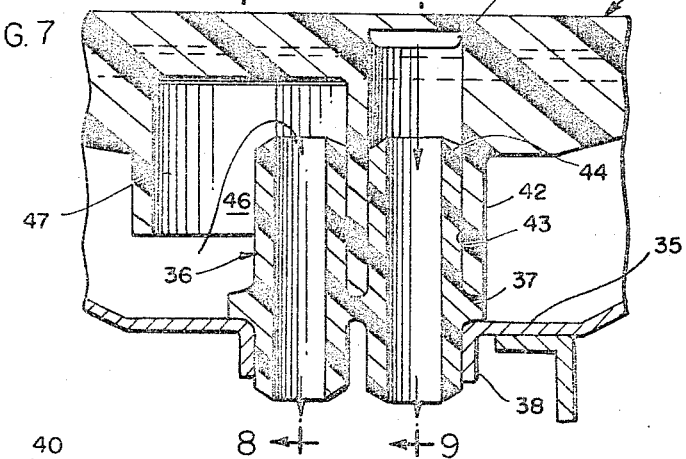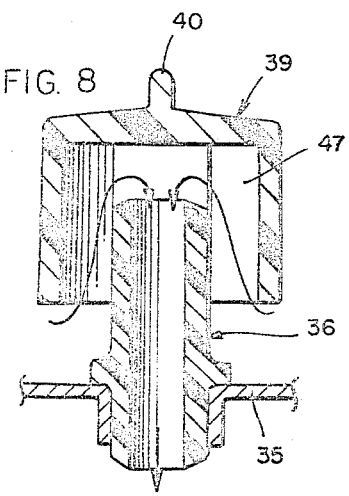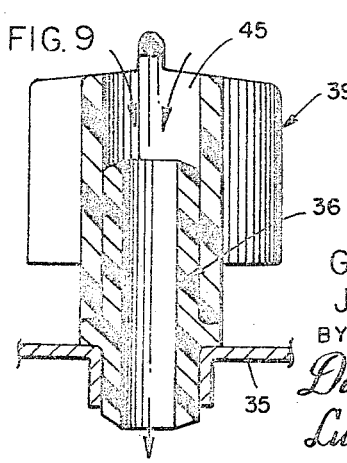

May 16, 1967  G. BIXBY, JR., ETAL  3,320,073
MEANS FOR BREWING COFFEE
Filed Oct. 16, 1964  3 Sheets-Sheet 3

INVENTORS:
GEORGE BIXBY, JR.
JERRY DEVARIS

BY: Dawson, Tilton, Fallon, Lungmus & Alexander
ATT'YS

United States Patent Office 3,320,073
Patented May 16, 1967

3,320,073
MEANS FOR BREWING COFFEE
George Bixby, Jr., Scottsdale, Ariz., and Jerry Devaris, Whiting, Ind., assignors to Automatic Marketing Industries, Inc., Phoenix, Ariz.
Filed Oct. 16, 1964, Ser. No. 404,389
2 Claims. (Cl. 99—71)

This invention relates to means for brewing coffee—as in decanter-sized batches.

More particularly, the invention relates to a coffee filter bag of novel construction which permits the rapid and effective making of an excellent brew of coffee and insures a constant and excellent brew at all times. The coffee filter bag is readily installable and removable in a coffee brewing device constructed also according to the teachings of the invention.

The invention solves problems which have heretofore existed with previously known coffee filter bags in that its construction insures the proper packing of the coffee within the bag itself and in connection with the coffee brewing device with which it is used.

Exemplary of the use of the invention is the restaurant trade, where decanter or carafes of about two-quart capacity, i.e., 50–60 oz., are employed to serve coffee. Because of the popular demand for coffee in restaurants, there is need for supplying brewed coffee in batches quickly and of uniform high quality. The provision of a means and method for doing this constitutes an object of the invention.

The well-known "coffee boiler" characteristic of many restaurants has failed to achieve this objective. Not only is their operation time-consuming when one considers the amount of maintenance, clean-up, etc., but the resultant product lacks the desirable high quality required by coffee drinkers. Coffee deteriorates noticeably upon standing, even in a heated condition, since the attractive aroma is fairly rapidly dissipated. Thus, the brewing of coffee in large quantities automatically fails to yield the desired quality since it is intended to store the coffee for some time to accommodate the dispensing over a substantial period.

The attempts to avoid these drawbacks through brewing smaller batches of coffee have resulted in complex mechanisms, necessitating substantial maintenance (oftentimes not readily available in small restaurants), and these are avoided and overcome by the instant invention.

An important aspect of the invention contributing to the simplicity and reliability of the operation is the use of prepackaged coffee wherein the unbrewed coffee remains within its container before, during and after the brewing cycle, so that there is no need to resort to a messy clean-up operation.

Present coffee brewers use bagged coffee (usually bagged with glassine) and a separate filter paper for each brew, or bagged coffee with a reusable cloth filter. The latter is undesirable from the standpoint of imparting unpalatable taste to the coffee when reused. In contrast to this, the instant invention employs a porous filter bag in a novel fashion, whereby substantially all of the coffee flavor is extracted from the unbrewed coffee. In this connection, the invention provides novel means for insuring that the unbrewed coffee is advantageously distributed within its confining container, whereby top quality liquid coffee is brewed therefrom. The provision of a novel coffee container, apparatus for supporting the same in a brewing operation, and a unique and advantageous method of coffee brewing constitutes additional objects of the invention.

Other objects and advantages of the invention may be seen in the details of construction and operation set down in this specification.

The invention is described in conjunction with an illustrative embodiment in the accompanying drawing, in which:

FIG. 1 is an elevational view of coffee brewing apparatus embodying the teachings of this invention, with the brewing chamber portion shown in phantom line;

FIG. 2 is an exploded perspective view of the brewing chamber element of FIG. 1;

FIG. 3 is a plan view of the coffee-containing filter bag of the invention;

Figure 10:
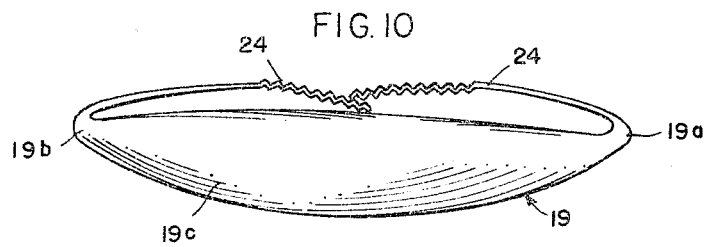
Figure 11:
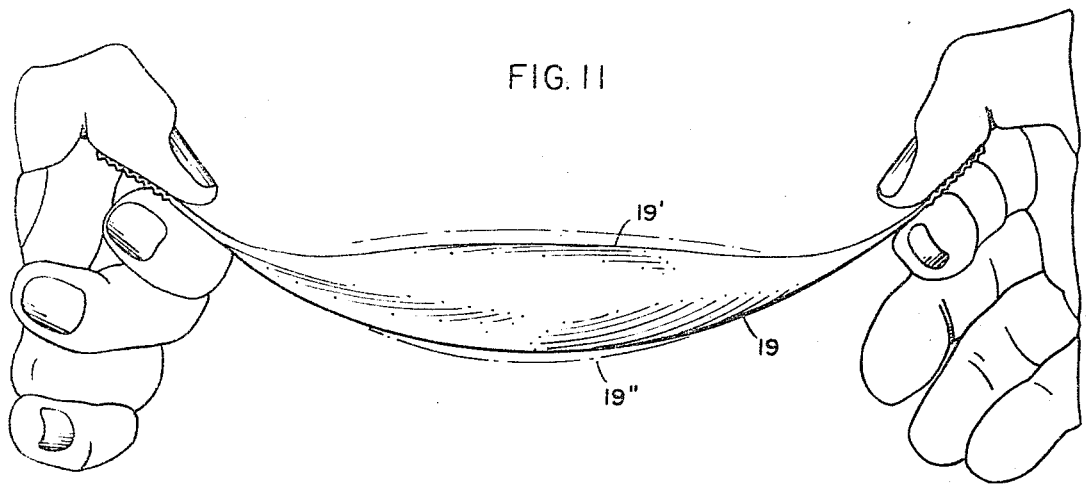
Figure 12:
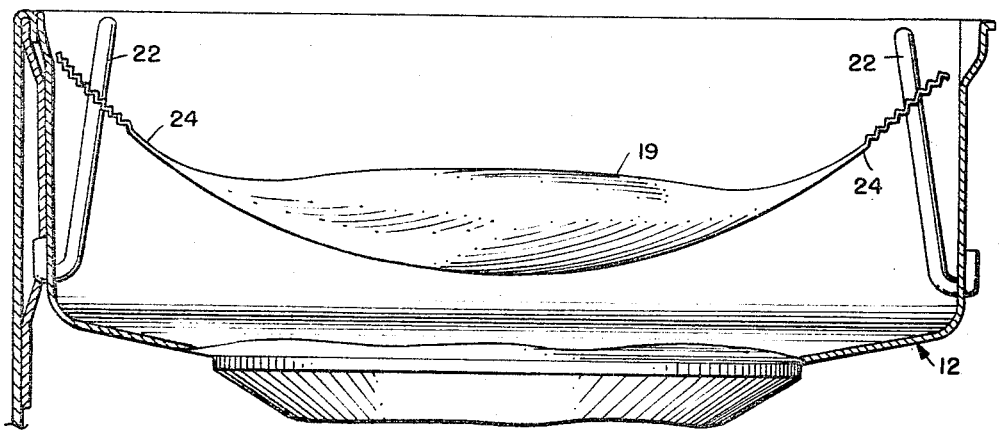

FIGS. 4 and 5 are sectional views taken along the sight lines 4—4 and 5—5, respectively, applied to FIG. 3;

FIG. 6 is an enlarged sectional view of the supporting pan portion of the invention;

FIG. 7 is an enlarged fragmentary sectional view of the central lower portion of FIG. 6;

FIGS. 8 and 9 are, respectively, sectional views taken along the sight lines 8—8 and 9—9 applied to FIG. 7;

FIG. 10 is a side elevational view of the coffee container or bag in the configuration thereof during shipment;

FIG. 11 is a fragmentary elevational view of the container of FIG. 10 when the same is being manually manipulated by a waitress or other restaurant operator during the course of installing the container in the inventive apparatus; and FIG. 12 is a fragmentary elevational view, partially in section, of the apparatus and container as the container is being manipulated in actual installation in the apparatus seen in FIG. 6.

In the illustration given and with particular reference to FIG. 1, the numeral 10 designates generally a coffee brewing apparatus. The apparatus 10 includes a casing 11 equipped with a removable pan-like drawer 12. The drawer 12 has affixed to it a handle 13 permitting removal of the drawer to disclose the components seen in FIG. 2. For this purpose, the casing 11 is equipped with suitable guides for receiving the drawer 12.

The casing 11 is foreshortened as at 14 to permit ready access to the dispensing fitting generally designated 15 (see FIG. 2) provided as part of the drawer unit 12. Additionally, the casing 11 is equipped with a heater-equipped platform 16 for supporting a carafe 17 about to receive coffee from the brewing chamber.

Referring now to FIG. 2, it is seen that the drawer 12 constitutes an open-topped vessel including a chamber 18 which receives the inventive bag or container generally designated 19. Water from the reservoir 20 (provided as part of the casing 11) flows downwardly through the bag 19 and is collected in the chamber 18 for discharge through the fitting 15 into the carafe 16.

For this purpose, the reservoir 20 provided as part of the housing 10 may have a two-gallon capacity. Operatively associated with the reservoir 20 is a control unit (not shown) for maintaining water within the reservoir 20 at a temperature slightly above 200° F., i.e., preferably 204° F. Energization of the control unit is achieved by a switch 20a (still referring to FIG. 1). The switch 20a also actuates a water control valve (not shown) interposed in the discharge line from the reservoir 20 and which delivers heated water over the central portion of the bag 19 when the same is confined and supported as seen in FIG. 6.

The temperature of the hot water in the reservoir 20 may be conveniently indicated by means of a thermometer 20b also provided on the casing 11. In many cases, complaints about the quality of coffee stem not from the ground coffee but from the fact that the water is not hot enough. This source of complaint is readily checked by means of the thermometer 20c.

An alternate discharge from the reservoir 20 is provided which may be controlled by the button 20c for the purpose of delivering heated water for tea. When a rectangular bag is placed within the chamber 18, there can arise the possibility of non-uniform distribution of the coffee 21 (see FIG. 4) within the bag. This then permits the water from the reservoir 20 to short-circuit or pass through portions of the bag not containing coffee grounds, whereby an imperfect brew is achieved. This is avoided through the provision of upstanding posts as at 22 (see FIG. 2) within the chamber 18. The posts 22 engage openings 23 in wing portions 24 of the bag 19. Thus, the bag 19 is immobilized in place over the bottom 25 of the chamber 18 (see also FIG. 6 where the bag 19 is seen in dotted line). The drawer 12 is apertured as at 26 generally centrally of the perimetric side wall 27—this wall being provided as an integral part of the drawer 12.

Advantageously, the bag 19 is constructed of filter paper impregnated with a suitable thermoplastic material such as that which is currently employed in tea bags and is commercially available under the name Dextar Type 24. The bag 19 has dimensions of 8″ x 4⅝″ in its lay-flat condition, and is equipped with wing portions 24 as previously referred to. The wing portions 24 each extend about one inch beyond the openable inner portion of the bag. As is best seen in FIG. 5, each wing 24 is equipped with transversely-extending corrugations or ribs 28. The ribs 28 cause the wings 24 to upstand against the portion of the perimetric side wall 27 as at 27a (see FIG. 6) and thus not interfere with the flow of water into all portions of the bag 19. Additionally, the bag is closed by a longitudinal seal as at 29 (see also FIG. 4). Reference to FIG. 2 reveals that the mounting openings 23 interrupt the longitudinal seal, and the longitudinal seal thereby provides a reinforcement for the openings 23, minimizing the possibility of tearing the same.

The three ounces of ground or unbrewed coffee (see FIG. 11) may be of the same grind that is now marketed to the restaurant trade. It will be noted that the bag 19 (in its inflated condition in FIG. 11) has only about half of its volume occupied by the ground coffee.

In operation, the bag 19 is grasped by the wings 24 and lowered into position within the chamber 18—this being illustrated in the sequence depicted in FIGS. 10–12. At this time, the openings 23 are aligned with the posts 22, which can be seen to be generally L-shaped—and upstanding from the end portions 27a of the perimetric side wall 27. The very act of mounting the bag 19 insures that the coffee contents 21 are substantially uniformly distributed throughout the bag 19. When a brewing cycle has been completed, the wings 24 again serve as convenient manipulating means for removing the bag, whereupon it can be disposed of in a garbage pail, or the like, and without the need of any cleansing of distributed coffee grounds. In order to insure proper concentration of the ground coffee in the center of the bag (to be over the central outlet 26), we find it advantageous to fold the bag prior to use. Optimally, this is done by folding the bag along the lines 19a and 19b to develop a center chamber 19c wherein the coffee is located. In use, the bag is unfolded so that the openings 23 engage the posts 22.

In the sequence depicted in FIGS. 10–12, the container or bag 19 is shown in its overfolded condition which has been found advantageous for shipment—confining the coffee to the central portion 19c of the bag 19. When the bag is about to be mounted within the drawer 12, and more particularly on the posts 22, the bag 19 is grasped as seen in FIG. 11 and lightly shaken to move the bag 19 to the positions indicated in dotted line and designated respectively by the numerals 19′ and 19″. Thereafter, the bag is lowered so that the wing portions 24 engage the upstanding posts as seen in FIG. 12. In this connection, it will be appreciated that FIG. 12 constitutes a showing of an intermediate stage of operation—showing the disposition of the bag 19 just prior to its seating within the drawer 12 as seen in FIG. 6.

Referring now to FIG. 6, it will be seen that the end walls of the drawer 12 are deformed as at 30 (see also FIG. 2) in positions adjacent to and in alignment with the L-shaped arms 22. This permits finger clearance when installing the wings 24 on the arms 22.

Still referring to FIG. 6, it will be noted that the bottom wall 25 is essentially flat (converging somewhat downwardly toward a central opening as at 31) and thus provides a means for perimetrically supporting the coffee-containing bag 19. Provided as part of the drawer 12 and mounted within the opening 31 is a collection housing generally designated 32. The housing 32 is essentially hopper-shaped and is characterized by an upstanding flange 33 which is advantageously welded to the depending flange 34 provided as part of the bottom wall 25—the flange 34 defining the perimeter of the opening 31.

The extreme bottom wall 35 of the hopper-like housing 32 is equipped with the discharge openings 26 previously referred to and the opening 26 is shaped to receive a nipple-providing fitment as at 36. The fitment 36 can be seen in perspective view in FIG. 2 and includes a perimetric flange as at 37 (see also FIG. 7) which insures that all brewed coffee exiting from the chamber 18 passes through the fitment 36. As seen in FIGS. 7–9, the annular flange 37 cooperates with the bottom wall 35 to effect a seal. As also seen in these three views, the bottom wall 35 includes a depending, integral flange as at 38 which receives the depending portions of the fitment 36 in a press-fit.

Mounted on the fitment 36 is the upper and main portion 39 of the fitting 15. In other words, the fitting 15 includes an upper fitment 39 and a lower fitment 36. The upper fitment 39 (see FIG. 2) is relatively elongated so as to extend generally coextensively with the hopper-like housing 32 which closes the open central bottom of the wall 25. However, the upper fitment 39 is relatively narrow and is characterized by an upstanding, longitudinally-extending rib as at 40 (compare FIGS. 2 and 8). The rib 40 provides an upper bearing surface for the central support of the bag 19 (see FIG. 6). However, the rib 40 is relatively narrow so that it does not obstruct the flow of brewing water through the coffee.

For a major portion of its length, the upper fitment 39 is equipped with a pair of identical, laterally-projecting flanges as at 41 (again see FIG. 2). These flanges integrate and support a depending portion 42 which serves as the interconnection between the upper and lower fitments 39 and 36, respectively. The depending portion 42 (now referring to FIG. 7) is seen to include a depending bushing 43 which receives one upstanding nipple 44 of the lower fitment 36. Advantageously, this is achieved through a press-fit, and it is seen that the bushing part 43 is equipped with an upwardly facing opening as at 45 (see also FIGS. 2 and 9). Thus, the opening 45 constitutes a first outflow passage for coffee liquid developed by introducing hot water into the chamber 18 above the bag 19. The co-action of the nipple part 44 with the bushing part 43 serves to immobilize the upper fitment 39 in a bag-supporting position within the collection housing 32.

A second outlet for brewed coffee liquid is provided by a second nipple part 46 (see FIG. 7). The nipple part 46 is provided integral with the first nipple part 44, but, unlike that part, does not communicate with the upper surface of the upper fitment 39. Instead, the second nipple part 46 projects into a siphon chamber 47 (see FIGS. 7 and 8) which is provided on the underside of the upper fitment 39. Thus, toward the close of a brewing cycle and when the liquid level drops below the opening 45, liquid can only exit from the collecting housing 32 by flowing upwardly into the siphon chamber 47 and then down through the second nipple part 46. At the very end of the brewing cycle, the second nipple part 46 serves as a standpipe to limit terminal drainage, which can take the form of vexatious drops. In the operation of the device, this provides a sharp cut-off of liquid flow at the end of the brewing cycle.

Advantageously, the two fitments 36 and 39 constituting the fitting 15 can be constructed of injection molded polypropylene having a smooth commercial finish. The bushing part 43 and the first nipple part 44 are sized relative to each other to develop a friction fit so that when a given brewing cycle is completed, the drawer 12 may be removed and inserted to discharge the bag 19 into a garbage unit without the possibility of detaching the fitting 15 from the drawer 12.

It will be appreciated that the shape of the bag or container 19 may be varied yet retaining the advantages of the invention. In some instances, it may be advantageous to provide the bag in a shape other than rectangular, i.e., circular, triangular, etc. In this connection, it will be noted that the bottom wall 25 (see particularly FIG. 6) provides a unique support surface for perimetrically supporting the bag 19 so as to preclude undesirable by-pass of the hot brewing water.

Irrespective of the actual contour of the bag, 19, the provision of a wing or tab as at 24 provides the advantageous operation indicated in FIGS. 10–12 wherein the wing provides a means for easily holding the bag by hand for the manual manipulation shown.

While in the foregoing specification a detailed description of an embodiment of the invention has been set down for the purpose of explanation, many variations in the details herein given may be made by those skilled in the art without departing from the spirit and scope of the invention.

We claim:

1. A coffee brewing device, comprising an open-topped vessel including interconnected side, end and bottom walls to define a brewing chamber, said bottom wall being apertured to provide an outlet for said chamber, said end walls each being equipped with an inwardly and upwardly projecting, generally L-shaped arm for securing only a portion of a flexible coffe bag in said chamber, a recess in said bottom wall about said aperture, and a discharge fitting in said recess communicating with said aperture, said discharge fitting providing an upper support surface for engagement with a bag secured on said arms.

2. In a method of brewing coffee, the steps of providing unbrewed coffee in a closed flexible bag having opening equipped tab means at each end thereof for manual grasping and support of said bag, said bag, prior to manipulation, being provided in over-folded condition with said tab means overlying the bag central portion wherein said unbrewed coffee is located, manually grasping said tab means to deform said bag to disperse said unbrewed coffee, and positioning said flexible bag in a brewing vessel so that the openings engage upstanding posts in said brewing vessel, and brewing coffee therewith.

References Cited by the Examiner

UNITED STATES PATENTS

| | | | |
|---|---|---|---|
| 2,138,358 | 11/1938 | Salfisberg | 99—77.1 |
| 2,451,195 | 10/1948 | Brown | 99—77.1 |
| 2,728,670 | 12/1955 | Young et al. | 99—77.1 |
| 2,786,761 | 3/1957 | Weisman | 99—77.1 |
| 2,822,273 | 2/1958 | Anderson | 99—171 |
| 2,835,057 | 5/1958 | Mathews | 99—77.1 |
| 2,878,927 | 3/1959 | Haley | 99—77.1 X |
| 2,990,096 | 6/1961 | Crosby | 99—171 |
| 3,048,070 | 8/1962 | Graves | 99—171 X |
| 3,092,012 | 6/1963 | Ruhnke | 99—307 |
| 3,143,955 | 8/1964 | Rockwell | 99—295 X |
| 3,209,676 | 10/1965 | Zimmerman et al. | 99—77.1 X |

A LOUIS MONACELL, *Primary Examiner.*

M. W. GREENSTEIN, *Assistant Examiner.*